UNITED STATES PATENT OFFICE.

JAMES HENDERSON, OF BELLEFONTE, PENNSYLVANIA, ASSIGNOR TO CHARLES G. FRANCKLYN, OF NEW YORK, N. Y.

ART OF LINING FURNACES, &c.

SPECIFICATION forming part of Letters Patent No. 265,067, dated September 26, 1882.

Application filed June 21, 1882. (No specimens.)

*To all whom it may concern:*

Be it known that I, JAMES HENDERSON, of Bellefonte, Pennsylvania, (formerly of New York,) have invented a new and useful Improvement in Compounds for Furnace-Linings and Fire-Brick, of which the following is such full, clear, and exact description as will enable those skilled in the art to make and use the same.

The object of this invention is to make a compound for furnace-lining and fire-brick for furnaces, converters, and other vessels in which metallurgic operations are carried on of lime or magnesian lime and oxide of iron and water.

In carrying out this invention I prefer to use lime made from the dolomite quarried near Springfield, Ohio, which is almost chemically pure and contains a large portion of magnesia, so that the lime is magnesian lime. Other dolomites or limestones which contain but small portions of silica will answer the purpose. The dolomite or limestone is calcined, preferably at a low heat—that is, below redness—after which it is slaked or hydrated with water and brought to the condition of flour.

The oxide of iron I preferably use consists of the pure iron-sands of Long Island, in the State of New York, or the purer kinds of iron ores from Lake Superior or Lake Champlain. Either of these may be used, or any oxide of iron which is practically free from impurities, and should be reduced to a fine sand or flour, so as to be able to pass through a sieve of about three thousand six hundred meshes to the square inch.

The lime (magnesian lime) and the oxide of iron, each prepared in the manner above set forth, are mixed together in about the proportions of ninety (90) per cent. lime (magnesian lime) and ten (10) per cent. oxide of iron, by weight, and water sufficient to make the whole the consistency of thick mortar. The lime (magnesian lime) may be mixed with water to the consistency of milk, and this then mixed with the oxide of iron to a thick mortar.

For the purposes of this compound I have found that magnesian lime is the equivalent of lime, and will make a somewhat harder compound when dried than that compounded of lime and the other ingredients.

This compound may be rammed into a furnace-hearth, or about the walls thereof, or in any vessel in which iron is to be treated, and dried by the atmosphere, when it is ready for use. If cracks appear in the lining so applied, more of the compound may be added to fill them; or the compound may be molded into brick and dried, and then burned in kilns at high temperatures. The brick should be burned at the temperature of steel-melting furnaces for five (5) or six (6) hours. These brick may be used as linings for furnaces, converters, or other metallurgic vessels, and will be found to be very refractory, hard, and tough.

I am aware that oxide of iron in small parts with unburned limestone or magnesian limestone and water have been used, and that burned lime or magnesia, or a mixture of these substances with oxide of iron, when it is rapidly crushed and kept heated to such a degree as to prevent the absorption of moisture, have been used, and that magnetic oxide of iron and titanic acid without lime have been used, and do not wish to be understood as claiming either of these compounds.

What I claim as new, and desire to secure by Letters Patent, is—

The compound for furnace-linings or fire-brick, consisting of lime or magnesian lime, oxide of iron, and water, in the proportions specified and set forth.

JAMES HENDERSON.

Witnesses:
JOHN C. SAYLOR,
ADAM WEIGHT.